(12) United States Patent
Asao

(10) Patent No.: US 6,472,793 B2
(45) Date of Patent: Oct. 29, 2002

(54) ALTERNATOR FOR VEHICLES

(75) Inventor: Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/780,479

(22) Filed: Feb. 12, 2001

(65) Prior Publication Data

US 2002/0021052 A1 Feb. 21, 2002

(30) Foreign Application Priority Data

Aug. 10, 2000 (JP) ........................................ 2000-242491

(51) Int. Cl.$^7$ ................................................. H02K 1/22
(52) U.S. Cl. ........................................ 310/263; 310/254
(58) Field of Search ................................. 310/263, 261, 310/254, 42

(56) References Cited

U.S. PATENT DOCUMENTS

| | | | |
|---|---|---|---|
| 3,714,484 A | * 1/1973 | Habert | 310/263 |
| 4,972,114 A | * 11/1990 | Frister | 310/263 |
| 5,270,605 A | * 12/1993 | Lefrancois et al. | 310/263 |
| 5,708,318 A | * 1/1998 | Fudono | 310/263 |
| 6,127,763 A | * 10/2000 | Nakamura et al. | 310/254 |
| 6,291,921 B1 | * 9/2001 | Asao | 310/263 |

FOREIGN PATENT DOCUMENTS

JP 48-11506 2/1973

* cited by examiner

Primary Examiner—Burton S. Mullins
(74) Attorney, Agent, or Firm—Sughrue Mion, PLLC

(57) ABSTRACT

The alternator comprises a stator including an iron core having teeth extending radially inwardly and arranged in a circumferential direction and a rotor including two sets of claw-like magnetic poles formed in a circumferential direction and fixedly mounted on a shaft in a state where the two sets of claw-like magnetic poles engage with each other. In each of the claw-like magnetic poles, an inclined surface is formed in each of both circumferential-direction side portions laying on an outer-diameter side of its proximal section. In this construction, when a circumferential-direction central position between the adjacent claw-like magnetic poles is aligned with a circumferential-direction central position of the tip portion of the tooth in the case of being viewed from a radial direction, the tip portion does not overlap with the outermost-diameter surface of each of the adjacent claw-like magnetic poles, but it overlaps with at least a portion of the inclined surface. A circumferential-direction distance $\tau$ between the outermost-diameter surface and the tip portion is set to be $0<\tau<3\delta$ where $\delta$ denotes an air gap defined therebetween.

15 Claims, 12 Drawing Sheets

ALTERNATOR FOR VEHICLES

CROSS REFERENCE TO RELATED APPLICATION

This application is based on Application No.2000-242491, filed in Japan on Aug. 10, 2000, the contents of which are hereby incorporated by reference.

BACKGROUND OF THE INVENTION

1. Field of the Invention

The present invention relates to an alternator for use in a vehicle in which a voltage develops in a stator in accordance with rotation of a rotor.

2. Description of the Related Art

FIG. 13 is a cross-sectional view showing a conventional alternator for a vehicle, FIG. 14 is a perspective view showing a rotor for use in the conventional alternator for the vehicle, FIG. 15 is a perspective view showing a stator for use in the conventional alternator, FIG. 16 is a perspective view showing an iron core of the stator as shown in FIG. 15, FIG. 17 is a plan view showing the essential part of the stator iron core, and FIG. 18 is an illustration of a circuit of the conventional alternator for the vehicle.

In FIG. 13, the conventional alternator for the vehicle is made up of a case 3 comprising front and rear brackets 1 and 2 made of aluminum, a shaft 6 provided in the interior of the case 3 and having one end portion fixedly mounted to a pulley 4, a Lundell Type rotor 7 fixedly fitted over the shaft 6, fans 5 fixedly mounted to both end portions of the rotor 7 in its axial directions, a stator 8 fixedly secured to the case 3 to surround the rotor 7, slip rings 9 fixedly mounted to the other end portion of the shaft 6 for current supply to the rotor 7, a pair of brushes 10 made to slide on a surface of the slip rings 9, a brush holder 11 accommodating the brushes 10, a rectifier 12 for rectifying an alternating current induced in the stator 8 into a direct current, and a regulator 18 fitted in the brush holder 11 for regulating the magnitude of an AC voltage developed in the stator 8.

As FIG. 14 shows, the rotor 7 is composed of a field coil 13 for generating magnetic flux on passage of electric current, and first and second pole core members 21 and 22 placed to cover the field coil 13, magnetic poles being formed in the pole core members 21 and 22 by the magnetic flux generated in the field coil 13. In addition, the first and second pole core members 21 and 22, being made of iron, are constructed such that claw-like (tooth-like) magnetic poles 23 and 24 whose outermost-diameter surfaces (surfaces having the largest diameter) have a generally trapezoidal configuration are protrusively formed at an equiangular pitch (at an equal interval) in circumferential directions on its outer circumferential edge section, with the first and second pole core members 21 and 22 being fixedly fitted over the shaft 6 to be in opposed relation to each other so that these claw-like magnetic poles 23 and 24 engage with each other.

Furthermore, as FIG. 15 shows, the stator 8 is composed of a cylindrical stator iron core 15 made by putting magnetic steel plates on top of each other and a stator winding 16 wound around the stator iron core 15. The stator iron core 15 is, as shown in FIGS. 16 and 17, made up of a ring-like core back 150 and a plurality of teeth 151 made to extend radially inwardly from the core back 150 so that they are arranged at an equiangular pitch in circumferential directions. In addition, the stator winding 16 is accommodated in each of slots 152 defined between the adjacent teeth 151. Still additionally, each of the teeth 151 comprises a tip portion 151a having a larger thickness (width) along the circumferential direction of the stator iron core 15 and a base (column) portion 151b making a connection between the tip portion 151a and the core back 150, with a slot opening portion 153 being defined between the adjacent tip portions 151a.

In this connection, to define a uniform air gap δ between the rotor 7 and the stator 8, the tip portion 151a of each of the teeth 151 is formed so that its inner circumferential surface has a concave configuration, while the claw-like magnetic poles 23 and 24 are made so that their outermost-diameter surfaces have a convex configuration.

In this conventional alternator for the vehicle, as shown in FIG. 18, the stator winding 16 is constructed as one three-phase alternating current winding in a manner that three winding phase groups 161 are coupled in the form of three-phase Y-connection. The rectifier 12 comprises diodes 120 and 121.

In this construction, the number of magnetic poles in the rotor 7 is twelve in number, and the slots 15 are formed at 36 places in the stator iron core 15 to accommodate the stator winding 16 constructed as one three-phase alternating current winding. This means that the number of slots is one per pole per phase.

In the conventional alternator for vehicles thus constructed, a current is supplied from a battery (not shown) through the brushes 10 and the slip rings 9 to the field coil 13, thereby generating a magnetic flux. Owing to this magnetic flux, the claw-like magnetic poles 23 of the first pole core member 21 are magnetized with north-seeking (N) poles, while the claw-like magnetic poles 24 of the second pole core member 22 are magnetized with south-seeking (S) poles. In addition, a flow of the magnetic flux takes place as indicated by an arrow A in FIG. 13. That is, the magnetic flux advances from the claw-like magnetic pole 23 through the opposed tooth 151 to the stator iron core 15, and further flows through the core back 150, the tooth 151 and the claw-like magnetic pole 24 facing the same tooth 151 to enter the second pole core member 22, and still further passes through the proximal portion of the second pole core member 22 to reach the first pole core 21.

Meanwhile, the pulley 4 is driven by an engine to rotate the rotor 7 through the shaft 6. The rotation of the rotor 7 causes a rotating magnetic field to be given to the stator iron core 15 so that an electromotive force is induced in the stator winding 16. The alternating current electromotive force produced in the stator 8 is rectified into a direct current by the rectifier 12, and the output voltage thereof is adjusted in magnitude through the use of the regulator 18, thereby accomplishing charging of the battery.

However, the conventional alternator for vehicles thus constructed will create the following problems. In a case in which the dimension of the slot opening portion 153 in its circumferential directions is made smaller in order to reduce the magnetic resistance of the air gap δ between the stator 8 and the rotor 7, when the central position in the circumferential direction between the adjacent claw-like magnetic poles 23 and 24 is aligned with the circumferential-direction central position of the inner circumferential surface of the tip portion 151a of the tooth 151 in the case of being viewed from a radial direction, a portion of each of the claw-like magnetic poles 23 and 24 overlaps concurrently with the tip portion 151a of the tooth 151. This reduces the magnetic flux variation to lessen magnetic noise. On the other hand, as indicated by an arrow B in FIG. 19, the magnetic flux fails to flow from the claw-like magnetic pole 23 through the tooth 151 to the core back 150, but flowing from the outermost-diameter surface and shoulder portion of the claw-like magnetic pole 23 through the tooth 151 to the claw-like magnetic pole 24, that is, the ineffective magnetic flux quantity increases; therefore, the bypassing quantity of the magnetic flux generated in the field coil 13 toward the stator winding 16 decreases accordingly to result in a decrease in output at low-speed rotation regions.

Furthermore, if the output at the low-speed rotation regions is increased by eliminating the overlapping between the claw-like magnetic poles 23, 24 and the tooth 151 in a case in which the central position in the circumferential direction between the adjacent claw-like magnetic poles 23 and 24 is aligned with the circumferential-direction central position of the inner circumferential surface of the tip portion 151a of the tooth 151 when viewed from a radial direction, the area of the outermost-diameter surface of the claw-like magnetic poles 23 and 24 decreases and the magnetic resistance between the rotor 7 and the stator 8 increases to conversely reduce the magnetic flux quantity itself to be generated, which makes it difficult to sufficiently produce the output at high-speed rotation regions.

SUMMARY OF THE INVENTION

Accordingly, for solving such problems, it is an object of the present invention to provide an alternator for a vehicle, capable of reducing the quantity of ineffective magnetic flux flowing between claw-like magnetic poles which are adjacent to each other in a state where a tooth is interposed therebetween, thereby increasing the effective magnetic flux for enhancing the output at low-speed rotation regions, and further capable of suppressing the increase in magnetic resistance between a rotor and a stator to secure the output at high-speed rotation regions, and still further capable of reducing the magnetic noise.

In accordance with the present invention, there is provided an alternator for a vehicle, comprising a stator including a stator iron core having a plurality of teeth extending radially inwardly and arranged at an interval in a circumferential direction to define slots between the plurality of teeth and a stator winding disposed in the slots, and a rotor including a pair of pole core members each of which has tapered claw-like magnetic poles formed on its outer-diameter side at a predetermined pitch in a circumferential direction and which are fixedly mounted on a shaft in a state where their claw-like magnetic poles engage with each other and further which are located inside the said stator so that a constant air gap $\delta$ is defined between the outermost-diameter surfaces of the claw-like magnetic poles and the tip portions of the teeth and a field coil located to be covered with the claw-like magnetic poles, wherein each of the claw-like magnetic poles includes an air gap enlargement surface formed in at least a portion of each of both circumferential-direction side portions on its outer-diameter side to provide an air gap larger than the air $\delta$ with respect to the tip portion of each of the teeth and, and when a circumferential-direction central position between the adjacent claw-like magnetic poles is aligned (meets) with a circumferential-direction central position of the tip portion of the tooth in the case of being viewed from a radial direction, the tip portion of the tooth does not overlap with the outermost-diameter surface of each of the adjacent claw-like magnetic poles, but it overlaps with at least a portion of the air gap enlargement surface of each of the adjacent claw-like magnetic poles, and a circumferential-direction distance $\tau$ between the outermost-diameter surface and the tip portion of the tooth is set to be $0<\tau<3\delta$.

In addition, the air gap enlargement surface may comprise an inclined surface formed in each of both the circumferential-direction side portions lying on the outer-diameter side of a proximal section of each of the claw-like magnetic poles.

Still additionally, the air gap enlargement surface may comprise an inclined surface formed in each of both the circumferential-direction side portions lying on the outer-diameter side of each of the claw-like magnetic poles to extend from a proximal side of the claw-like magnetic pole to a tip portion side thereof.

In this case, the inclined surface may be formed into a tapering configuration in which its circumferential-direction width gradually decreases from a proximal side of the claw-like magnetic pole to a tip portion side thereof.

Moreover, each of shoulder portions of the claw-like magnetic pole located on both axial-direction end sides of the rotor may be formed into an inclined surface having one of rounded and tapered configurations, and the outermost-diameter surface, the air gap enlargement surface and the shoulder portion inclined surface may be brought close to each other in the vicinity of each of both axial-direction ends of the tip portion of the tooth.

Still moreover, the tip portions of the plurality of teeth may be made to overlap with a plane including the outermost-diameter surface and the air gap enlargement surface in each of the adjacent claw-like magnetic poles, when viewed from a radial direction.

Furthermore, the stator may have two slots per pole and per phase.

In addition, the stator winding may be composed of two alternating-current windings different in phase from each other.

Still additionally, the circumferential-direction widths of the tip portions of the teeth may be formed in an unequal condition.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Embodiments of the present invention will be described hereinbelow with reference to the drawings.

First Embodiment

Figure 1:
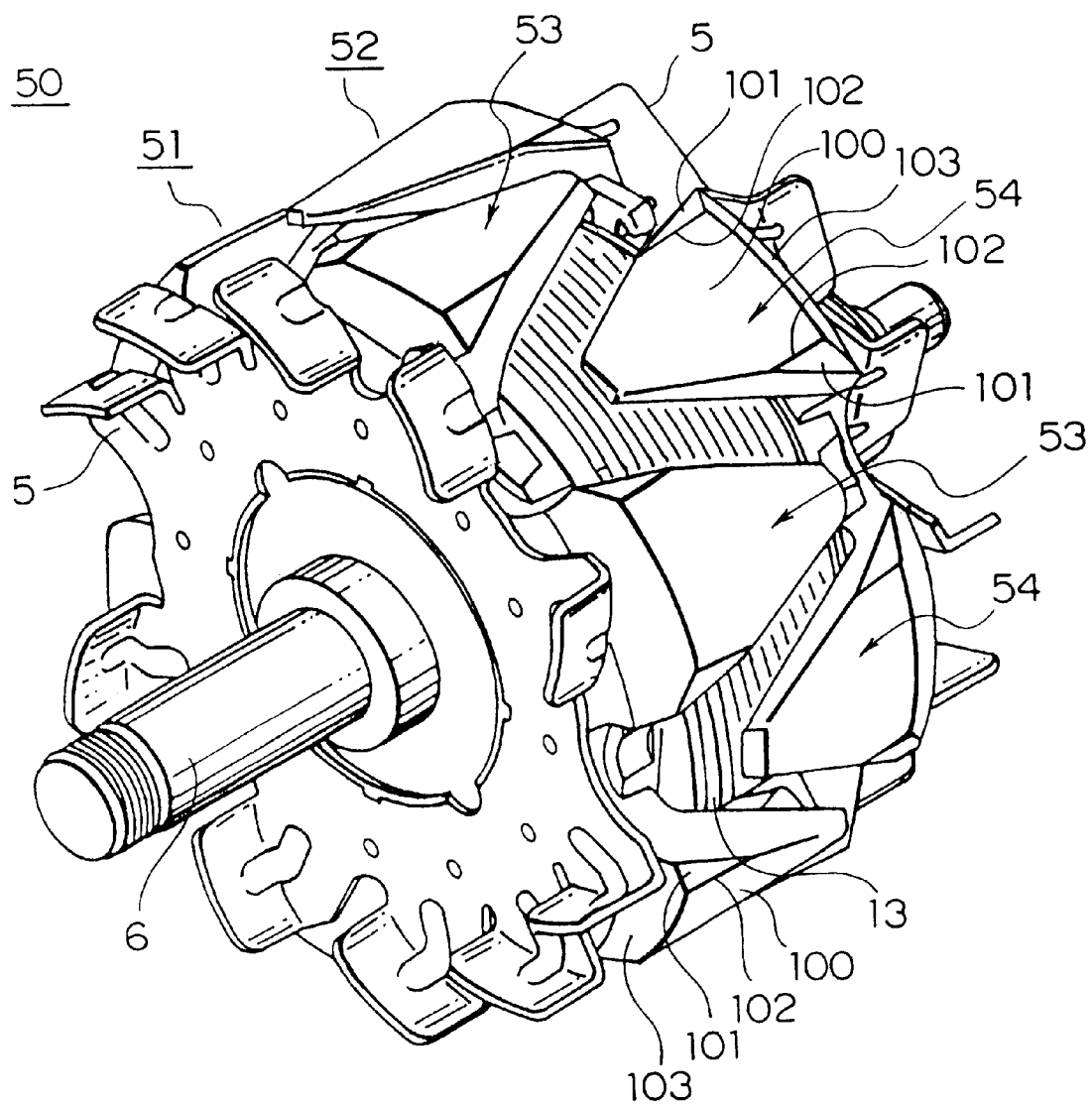
FIG. 1 is a perspective view showing a rotor for use in an alternator for a vehicle according to a first embodiment of the present invention.
Figure 2:
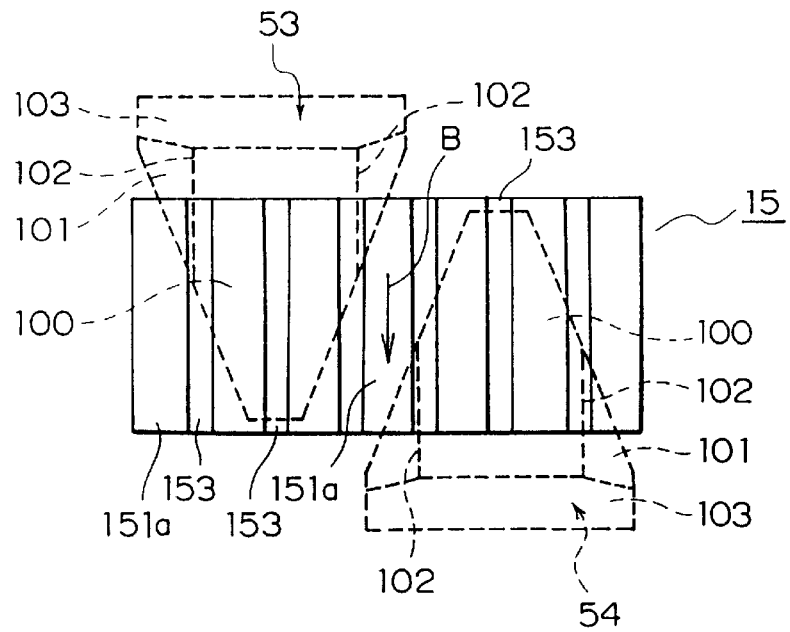
FIG. 2 is an illustration useful for explaining the positional relationship between an inner circumferential surface of a stator iron core and an outer circumferential surface of a rotor in the alternator for the vehicle according to the first embodiment of the invention.
Figure 3:
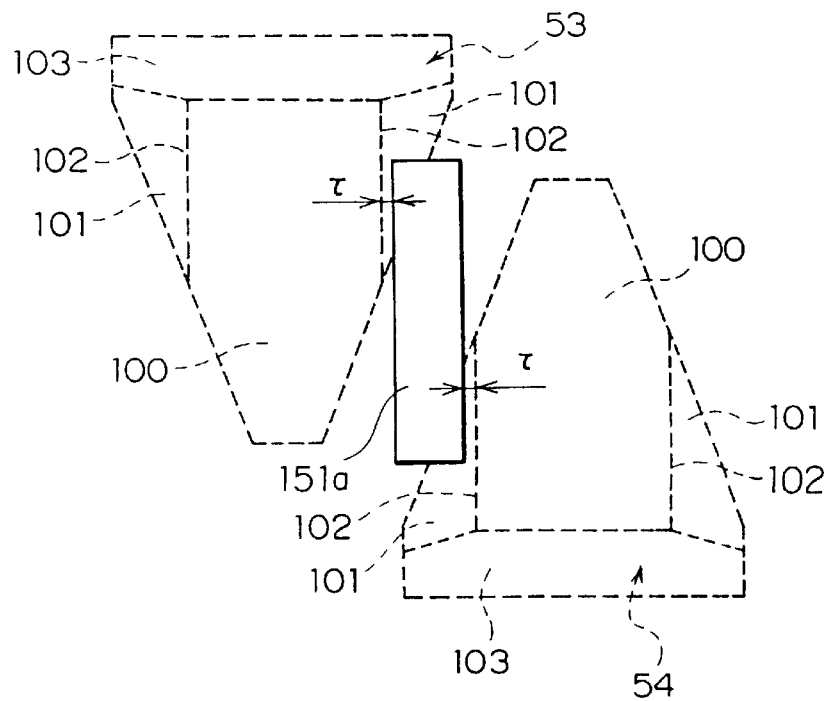
FIG. 3 is an essence enlarged illustration for the explanation of the positional relationship between the inner circumferential surface of the stator iron core and the outer circumferential surface of the rotor in the alternator for the vehicle according to the first embodiment of the invention.

FIG. 1 is a perspective view showing a rotor for use in an alternator for a vehicle according to a first embodiment of the present invention, FIG. 2 is an illustration useful for explaining the positional relationship between an inner circumferential surface of a stator iron core and an outer circumferential surface of the rotor in the alternator for the vehicle according to the first embodiment of the invention, and FIG. 3 is an enlarged illustration of the essence in FIG. 2.

In these illustrations, parts identical or corresponding to those in the conventional device shown in FIGS. 13 to 19 are marked with the same reference numerals, and the description thereof will be omitted for brevity.

In FIG. 1, a rotor 50 is equipped with a field coil 13 for generating magnetic flux on passage of electric current, and first and second pole core members 51 and 52 located to cover the field coil 13, magnetic poles being formed in the pole core members 51 and 52 by the magnetic flux generated in the field coil 13. In addition, the first and second pole core members 51 and 52, being made of iron, are constructed such that claw-like (tooth-like) magnetic poles 53 and 54 each of which are six in number and whose outermost-diameter surfaces have a generally trapezoidal configuration are protrusively formed at an equiangular pitch (at an equal interval) in circumferential directions on its outer circumferential edge section, with the first and second pole core members 51 and 52 being fixedly fitted over the shaft 6 to be in opposed relation to each other so that these claw-like magnetic poles 53 and 54 engage with each other. In each of the claw-like magnetic poles 53 and 54, as an air gap enlargement surface, an inclined surface 101 is formed in each of both circumferential-direction side portions lying on an outer-diameter side of a proximal section thereof so that a ridge line (edge) 102 where the inclined surface 101 and an outermost-diameter surface 100 is substantially in parallel with the axis of a shaft 6. In addition, as FIGS. 2 and 3 show, when the central position in a circumferential direction between the adjacent claw-like magnetic poles 53 and 54 is aligned with the circumferential-direction central position of an inner circumferential surface of the tip portion 151a of each of teeth 151 in the case of being viewed from a radial direction, the tip portion 151a of the tooth 151 is designed so as not to overlap with the outermost-diameter surfaces 100 of the claw-like magnetic poles 53 and 54, but overlapping with the inclined surface 101. At this time, a circumferential-direction distance (gap distance) τ between the ridge line 102 and the tip portion of the tooth 151 is set to be τ>0. In addition, an axial-direction end portion of the outermost-diameter section of each of the claw-like magnetic poles 53 and 54 is chamfered to form a shoulder portion 103 having a rounded or tapered configuration. Thus, the outermost-diameter surface 100, the inclined surface 101 and the shoulder portion 103 are placed to be adjacent to each other in the vicinity of an axial-direction end portion of the tip portion 151a of the tooth 151.

Incidentally, the alternator for the vehicle according to this first embodiment is similar to the conventional alternator for the vehicle shown in FIGS. 13 to 19 except that the rotor 50 mentioned above is mounted in place of the rotor 7.

In the alternator for the vehicle thus constructed, when the circumferential-direction central position between the adjacent claw-like magnetic poles 53 and 54 is aligned with the circumferential-direction central position of the inner circumferential surface of the tip portion 151a of the tooth 151 in the case of being viewed from a radial direction, since the tip portion 151a of the tooth 151 does not overlap with the outermost-diameter surface 100 of each of the claw-like magnetic poles 53 and 54, the quantity of the ineffective magnetic flux that fails to flow from the claw-like magnetic pole 53 through the tooth 151 to a core back 150 but flowing from the outermost-diameter surface 100 through the tip portion 151a of the tooth 151 to the neighboring claw-like magnetic pole 54 is reducible, thus increasing the effective magnetic flux quantity accordingly. In addition, since the shoulder portion 103 is shaped into a round or tapered configuration, the quantity of the ineffective magnetic flux that flows from the shoulder portion 103 of the claw-like magnetic pole 53 through the tip portion 151a of the tooth 151 to the neighboring claw-like magnetic pole 54 is reducible, thus increasing the effective magnetic flux. In consequence, the drop of an output at low-speed rotation regions originating from the ineffective magnetic flux is suppressible, thereby realizing the generation of a high output.

Moreover, in each of the claw-like magnetic poles 53 and 54, since the inclined surface 101 is formed in only each of both the circumferential-direction side portions lying on the outer-diameter side of the proximal section thereof, the area of the outermost-diameter surface 100 is enlargeable so that a high output is attainable.

Furthermore, when the circumferential-direction central position between the adjacent claw-like magnetic poles 53 and 54 is aligned with the circumferential-direction central position of the inner circumferential surface of the tip portion 151a of the tooth 151 in the case of being viewed from a radial direction, the tip portion 151a of the tooth 151 overlaps with a portion of each of the claw-like magnetic poles 53 and 54, which decreases the magnetic flux variation and reduces the magnetic noise.

In addition, although the abrupt variation of the magnetic flux density distribution produces a factor to boost the magnetic noise, in the case of this embodiment, since the formation of the inclined surfaces 101 causes gentle variation of the magnetic flux density distribution between the inclined surface 101 of each of the claw-like magnetic poles 53, 54 and the tip portion 151a of the tooth 151, the increase in magnetic noise is restrainable.

Figure 4:
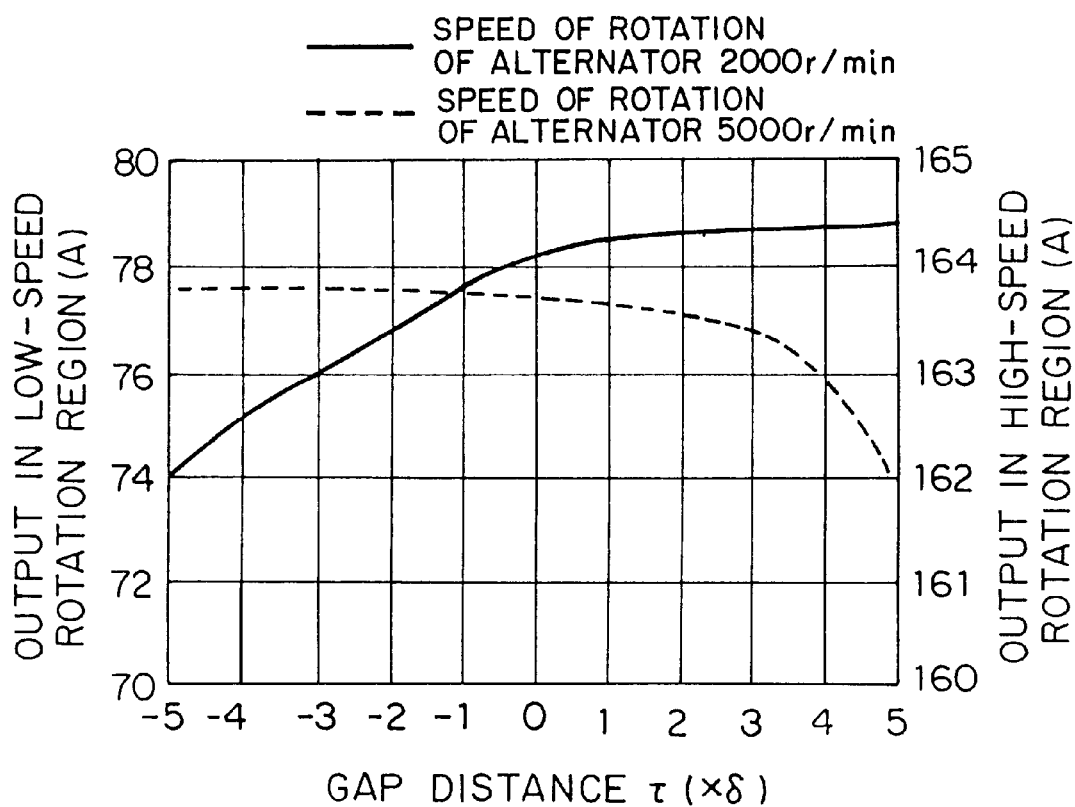
FIG. 4 is a graphic view showing the relationship between a gap distance between a tooth tip portion and a claw-like magnetic pole outermost-diameter surface and an output in the alternator for the vehicle according to the first embodiment of the invention.

FIG. 4 shows, in a case in which a rotor is made such that the gap distance τ varies with respect to the air δ (0.35 mm), an output measurement result of an alternator for a vehicle incorporating this rotor. In FIG. 4, a solid line represents an output in a low-speed rotation region (output taken when the speed of rotation of the alternator assumes 2000 r/min) while a dotted line denotes an output in a high-speed rotation region (output taken when the speed of rotation of the alternator is at 5000 r/min).

From FIG. 4, it is seen that the output in a low-speed rotation region is such that, in the case of the area of τ<0, the output decreases with increase in degree of overlapping between the outermost-diameter surfaces 100 of the claw-like magnetic poles 53, 54 and the tip portion 151a of the tooth 151 in a circumferential direction, while in the case of the area of τ≧0, the output increases gradually with increase in gap distance τ between the outermost-diameter surfaces 100 of the claw-like magnetic poles 53, 54 and the tip portion 151a of the tooth 151.

Furthermore, FIG. 4 indicates that the output in a high-speed rotation region is such that a greater output is obtained as the gap distance τ becomes shorter, while the output drops rapidly when the gap distance τ exceeds 3δ. Presumedly, this is because, although the area of the outermost-diameter surface 100 increases as the gap distance τ decreases, since the area of the outermost-diameter surface 100 becomes extremely small when the gap distance τ exceeds 3δ, the magnetic resistance between the rotor and the stator increases so that the quantity of the magnetic flux itself to be generated decreases to cause the output to drops largely.

Still furthermore, the degree of overlapping between the claw-like magnetic poles 53, 54 and the tip portion 151a increases as the gap distance τ decreases, thus resulting in a reduction in magnetic flux variation and a reduction in magnetic noise.

Accordingly, in order to enhance the output in a low-speed rotation region, ensure the output in a high-speed rotation region and reduce the magnetic noise, preferably, 0<τ<3δ, most preferably, τ=1.5δ.

Second Embodiment

Figure 5:
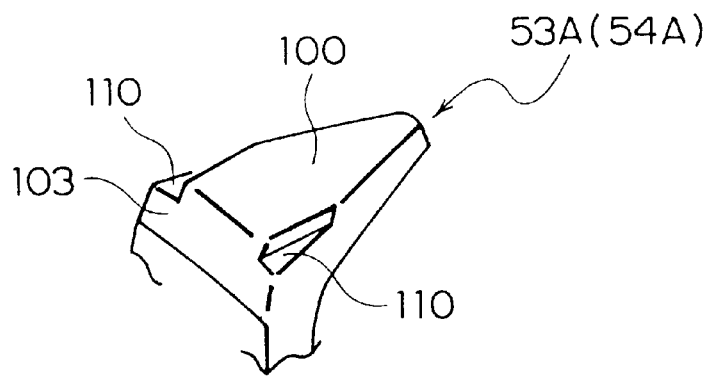
FIG. 5 is a perspective view showing an appearance of a claw-like magnetic pole of a rotor for use in an alternator for a vehicle according to a second embodiment of the invention.

Although in the above-described first embodiment the inclined surfaces 101 are formed in both the circumferential-direction side portions lying on the outer-diameter side of the proximal section of each of the claw-like magnetic poles 53 and 54 to avoid the overlapping between the outermost-diameter surfaces 100 of the claw-like magnetic poles 53, 54 and the tip portion 151a of each of the teeth 151, in the second embodiment, as shown in FIG. 5, a step (difference in level) 110 is formed as an air gap enlargement surface in each of both the circumferential-direction side portions laying on the outer-diameter side of the proximal section of each of the claw-like magnetic poles 53A and 54A. Also in the construction of the second embodiment, owing to the formation of the step 110, when the circumferential-direction central position between the adjacent claw-like magnetic poles 53A and 54A is aligned with the circumferential-direction central position of the inner circumferential surface of the tip portion 151a of the tooth 151, the tip portion 151a of the tooth 151 does not overlap with the outermost-diameter surfaces 100 of the claw-like magnetic poles 53A and 54A, but overlapping with the step 110.

Also in the second embodiment, when the circumferential-direction central position between the adjacent claw-like magnetic poles 53A and 54A aligns with the circumferential-direction central position of the inner circumferential surface of the tip portion 151a of the tooth 151 in the case of being viewed from an radial direction, the tip portion 151a of the tooth 151 does not overlap with the outermost-diameter surfaces 100 of the claw-like magnetic poles 53A and 54A but overlapping with the step 110; therefore, the same effects as those of the above-described first embodiment are obtainable.

In addition, the setting of 0<τ<3δ can not only enhance the output in low-speed rotation regions, but also secure the output in high-speed rotation regions, and even reduce the magnetic noise.

Incidentally, in the second embodiment, since the steps 110 are formed in both the circumferential-direction side portions laying on the outer-diameter side of the proximal section of each of the claw-like magnetic poles 53A and 54A, the magnetic flux density distribution between the claw-like magnetic poles 53A, 54A and the tip portion 151a of the tooth 151 varies rapidly at the time of shifting from the outermost-diameter surface 100 to the step 110. Thus, the second embodiment is inferior in magnetic noise to the above-described first embodiment.

Third Embodiment

Figure 6:
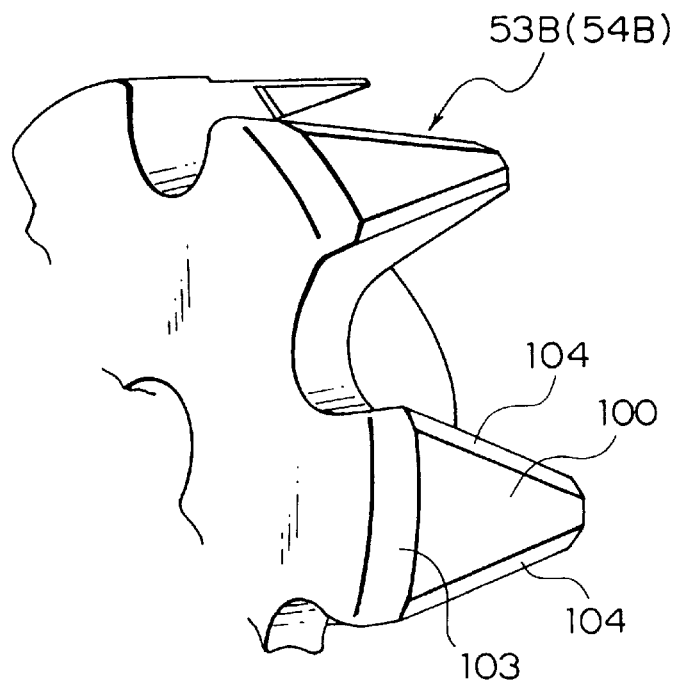
FIG. 6 is a perspective view showing the essence of a rotor for use in an alternator for a vehicle according to a third embodiment of the invention.

Although in the above-described first embodiment the inclined surfaces 101 are formed in both the circumferential-direction side portions lying on the outer-diameter side of the base section of each of the claw-like magnetic poles 53 and 54, a third embodiment is such that, as shown in FIG. 6, an inclined surface 104 is formed as an air gap enlargement surface in each of both the circumferential-direction side portions lying on the outer-diameter side of each of the claw-like magnetic poles 53B and 54B to extend from its proximal side to its tip side. Also in this third embodiment, when the circumferential-direction central position between the adjacent claw-like magnetic poles 53B and 54B aligns with the circumferential-direction central position of an inner circumferential surface of the tip portion 151a of the tooth 151 in the case of being viewed from a radial direction, the tip portion 151a of the tooth 151 does not overlap with the outermost-diameter surfaces 100 of the claw-like magnetic poles 53B and 54B, but it overlaps with a portion of the inclined surface 104. The inclined surface 104 is made to have a constant width in each of the outer-diameter side circumferential-direction side portions of each of the claw-like magnetic poles 53B and 54B when viewed from a radial direction.

Also in the third embodiment, when the circumferential-direction central position between the adjacent claw-like magnetic poles 53B and 54B aligns with the circumferential-direction central position of the inner circumferential surface of the tip portion 151a of the tooth 151 in the case of being viewed from an radial direction, the tip portion 151a of the tooth 151 does not overlap with the outermost-diameter surfaces 100 of the claw-like magnetic poles 53B and 54B; therefore, the quantity of the ineffective magnetic flux that does not flow from the claw-like magnetic pole 53B through the tooth 151 to the core back 150 but flowing to the neighboring claw-like magnetic pole 54B is reducible, which leads to an increase in the effective magnetic flux quantity. In consequence, the drop of the output at low-speed rotation regions stemming from the ineffective magnetic flux is restrainable as in the case of the above-described first embodiment. In addition, the setting of 0<τ<3δ can enhance the output in low-speed rotation regions and secure the output in high-speed rotation regions.

Moreover, since the tip portion 151a of the tooth 151 overlaps with a portion of each of the claw-like magnetic poles 53B and 54B when the circumferential-direction central position between the adjacent claw-like magnetic poles 53B and 54B aligns with the circumferential-direction central position of the inner circumferential surface of the tip portion 151a of the tooth 151 in the case of being viewed from an radial direction, it is possible to reduce the magnetic flux variation and further to lessen the magnetic noise.

Still moreover, since the inclined surfaces 104 are made in both the circumferential-direction side portions laying on the outer-diameter side of each of the claw-like magnetic poles 53B and 54B to extend from their base sides to their tip sides, in the entire area from the proximal side to the tip side in both the circumferential-direction side portions of each of the claw-like magnetic poles 53B and 54B, the magnetic flux density distribution between the inclined surface 104 and the tip surface of the tooth 151 shows gentle variation. Thus, as compared with the above-described first embodiment in which the magnetic flux density distribution varies slowly in only both the circumferential-direction side portions lying on the outer-diameter side of the proximal section of each of the claw-like magnetic poles 53 and 54, it is possible to further suppress the occurrence of the magnetic noise.

Fourth Embodiment

Figure 7:
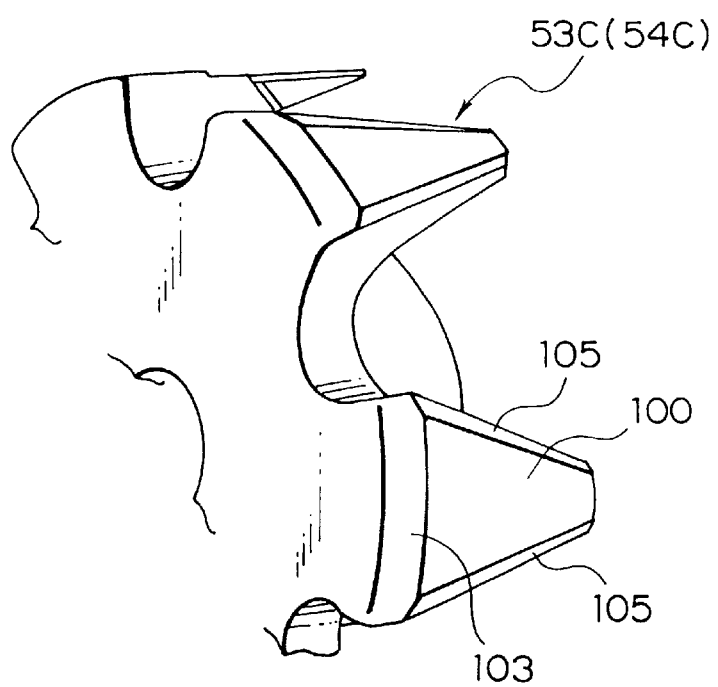
FIG. 7 is a perspective view showing the essence of a rotor for use in an alternator for a vehicle according to a fourth embodiment of the invention.

Although in the above-described third embodiment the inclined surfaces 104 having a constant width are formed in both the circumferential-direction side portions lying on the outer-diameter side of each of the claw-like magnetic poles 53B and 54B when viewed from a radial direction to extend from their proximal sides to their tip sides, in a fourth embodiment, as shown in FIG. 7, a tapering inclined surface 105 is formed as an air gap enlargement surface in each of both circumferential-direction side portions laying on the outer-diameter side of each of claw-like magnetic poles 53C and 54C to extend from its proximal side to its tip side. Also in the fourth embodiment, when the circumferential-direction central position between the adjacent claw-like magnetic poles 53C and 54C aligns with the circumferential-direction central position of an inner circumferential surface of the tip portion 151a of the tooth 151 in the case of being viewed from a radial direction, the tip portion 151a of the tooth 151 does not overlap with the outermost-diameter surfaces 100 of the claw-like magnetic poles 53C and 54C, but it overlaps with a portion of the inclined surface 105. The inclined surface 105 is made to have a larger width on the proximal side of each of the claw-like magnetic poles 53C and 54C while having a smaller width on the tip side thereof when viewed from a radial direction.

Furthermore, also in the fourth embodiment, when the circumferential-direction central position between the adjacent claw-like magnetic poles 53C and 54C aligns with the circumferential-direction central position of the inner circumferential surface of the tip portion 151a of the tooth 151 in the case of being viewed from an radial direction, the tip portion 151a of the tooth 151 does not overlap with the outermost-diameter surfaces 100 of the claw-like magnetic poles 53C and 54C; therefore, the quantity of the ineffective magnetic flux that does not flow from the claw-like magnetic pole 53C through the tooth 151 to the core back 150 but flowing to the neighboring claw-like magnetic pole 54C is reducible, which results in an increase in the effective magnetic flux quantity. In consequence, the drop of the output at low-speed rotation regions stemming from the ineffective magnetic flux is restrainable as with the above-described first embodiment. In addition, the setting of 0<τ<3δ can enhance the output in low-speed rotation regions and secure the output in high-speed rotation regions.

Moreover, since the tip portion 151a of the tooth 151 overlaps with a portion of each of the claw-like magnetic poles 53C and 54C when the circumferential-direction central position between the adjacent claw-like magnetic poles 53C and 54C aligns with the circumferential-direction central position of the inner circumferential surface of the tip portion 151a of the tooth 151 in the case of being viewed from an radial direction, it is possible to reduce the magnetic flux variation and further to lessen the magnetic noise.

Still moreover, since the inclined surfaces 105 are made in both the circumferential-direction side portions laying on the outer-diameter side of each of the claw-like magnetic poles 53C and 54C to extend from their base sides to their tip sides, in the entire area from the proximal side to the tip side in both the circumferential-direction side portions of each of the claw-like magnetic poles 53C and 54C, the magnetic flux density distribution between the inclined surface 105 and the tip surface of the tooth 151 shows gentle variation. Thus, as compared with the above-described first embodiment in which the magnetic flux density distribution varies slowly in only both the circumferential-direction side portions lying on the outer-diameter side of the proximal section of each of the claw-like magnetic poles 53 and 54, the occurrence of the magnetic noise is further suppressible.

In this case, the circumferential-direction width of the inclined surface 105 on the proximal side of each of the claw-like magnetic poles 53C and 54C is secured so that the outermost-diameter surface 100 of the claw-like magnetic pole 53C, 54C and the tip portion 151a of the tooth 151 do not overlap with each other when the circumferential-direction central position between the adjacent claw-like magnetic poles 53C and 54C aligns with the circumferential-direction central position of the tip surface of the tooth 151 in the case of being viewed from a radial direction. In addition, since the inclined surface 105 is formed into a tapering configuration so that its width tapers off from the proximal side of each of the claw-like magnetic poles 53C and 54C to the tip side thereof when viewed from a radial direction, as compared with the above-described third embodiment employing the inclined surfaces 104 of a constant width, it is possible to enlarge the area of the outermost-diameter surface 100, which provides a high output.

Fifth Embodiment

Figure 8:
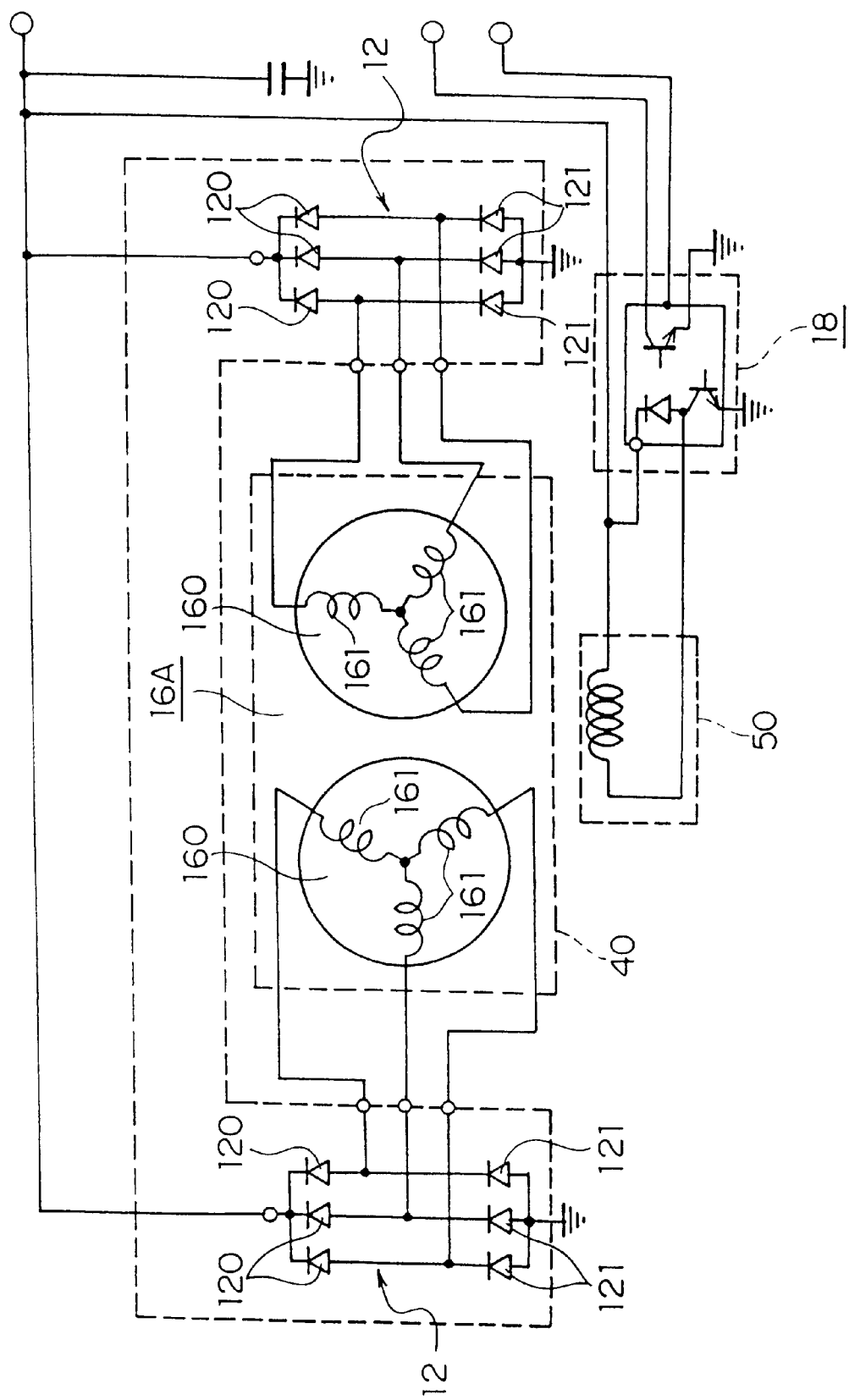
FIG. 8 is an illustration of a circuit for an alternator for a vehicle according to a fifth embodiment of the invention.
Figure 9:
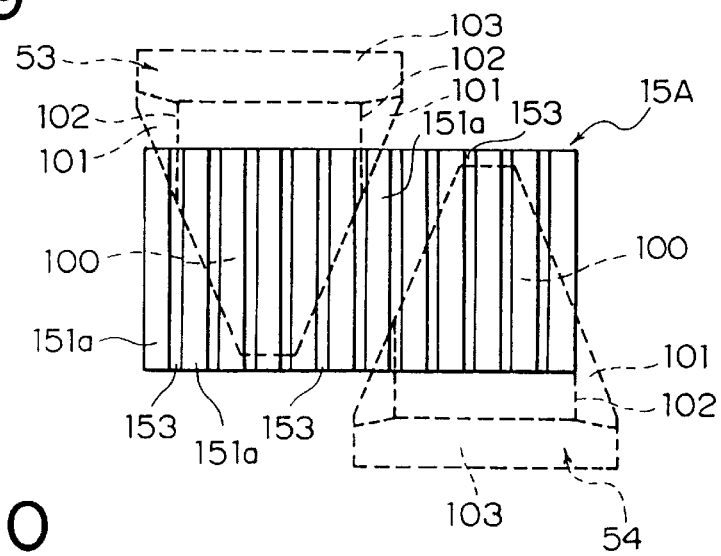
FIG. 9 is an illustration useful for explaining the positional relationship between an inner circumferential surface of a stator iron core and an outer circumferential surface of a rotor in the alternator for the vehicle according to the fifth embodiment of the invention.

FIG. 8 is an illustration of a circuit for an alternator for a vehicle according to a fifth embodiment of the invention, and FIG. 9 is an illustration of the positional relationship between an inner circumferential surface of a stator iron core and an outer circumferential surface of a rotor in the alternator for the vehicle according to the fifth embodiment of the invention.

In this fifth embodiment, as FIG. 8 shows, a stator winding 16A of a stator 40 comprises two three-phase alternating current windings 160 each of which is formed with three winding phase groups 161 being connected into a three-phase Y-connection, and the two three-phase alternating current windings 160 provide a phase difference of 30 degrees in electrical angle. In addition, each of the two three-phase alternating current windings 160 is electrically connected to a rectifier 12 comprising diodes 120 and 121, with the outputs of the two rectifiers 12 being in parallel to each other.

Furthermore, the magnetic poles of the rotor 50 are twelve in number, and a stator iron core 15A of the stator 40 has slots 152 formed at 72 places to accommodate the stator winding 16A comprising the two three-phase alternating current windings 160. That is, the number of slots per pole and per phase is two.

Still furthermore, as FIG. 9 shows, the rotor 50 and the stator 40 are designed such that, when the circumferential-direction central position between the adjacent claw-like magnetic poles 53 and 54 aligns with the circumferential-direction central position of an inner circumferential surface of the tip portion 151a of a tooth 151 in the case of being viewed from a radial direction, the tip portion 151a of the tooth 151 does not overlap with the outermost-diameter surfaces 100 of the claw-like magnetic poles 53 and 54 but it overlaps with an inclined surface 101. The other configuration is similar to that of the foregoing first embodiment.

In the alternator for the vehicle thus constructed, a current is supplied from a battery (not shown) through brushes 10 and slip rings 9 to a field coil 13, thereby generating a magnetic flux. Owing to this magnetic flux, the claw-like magnetic poles 53 of the first pole core member 51 are magnetized with north-seeking (N) poles, while the claw-like magnetic poles 54 of the second pole core member 52 are magnetized with south-seeking (S) poles.

Meanwhile, the pulley 4 is driven by an engine to rotate the rotor 50 through a shaft 6. The rotation of the rotor 50 causes a rotating magnetic field to be given to the stator iron core 15A so that an electromotive force is induced in the two three-phase alternating current windings 160 constituting the stator winding 16A, and an output current is developed by an external load connected to the alternator for the vehicle. The alternating currents produced in the two three-phase alternating current windings 160 are rectified into direct currents by the rectifier 12 and then combined with each other. The combined output is supplied to the external load.

Also in the fifth embodiment, when the circumferential-direction central position between the adjacent claw-like magnetic poles 53 and 54 aligns with the circumferential-direction central position of the inner circumferential surface of the tip portion 151a of the tooth 151 in the case of being viewed from an radial direction, the tip portion 151a of the tooth 151 does not overlap with the outermost-diameter surfaces 100 of the claw-like magnetic poles 53 and 54; therefore, the quantity of the ineffective magnetic flux that does not flow from the claw-like magnetic pole 53 through the tooth 151 to the core back 150 but flowing to the neighboring claw-like magnetic pole 54 is reducible, which results in an increase in the effective magnetic flux quantity. In consequence, the drop of the output at low-speed rotation regions stemming from the ineffective magnetic flux is restrainable as with the above-described first embodiment. In addition, the setting of $0<\tau<3\delta$ can enhance the output in low-speed rotation regions and secure the output in high-speed rotation regions.

Moreover, since the tip portion 151a of the tooth 151 overlaps with a portion of each of the claw-like magnetic poles 53 and 54 when the circumferential-direction central position between the adjacent claw-like magnetic poles 53 and 54 aligns with the circumferential-direction central position of the inner circumferential surface of the tip portion 151a of the tooth 151 in the case of being viewed from an radial direction, it is possible to reduce the magnetic flux variation and further to lessen the magnetic noise as in the case of the foregoing first embodiment.

Furthermore, also in the fifth embodiment, as compared with the foregoing first embodiment, since the circumferential-direction width of the tip portion 151a of the tooth 151 becomes smaller in proportion to the increase in the number of the slots 152, the magnetic passage cross section of the tip portion 151a becomes smaller and the magnetic resistance of the tip portion 151a itself becomes higher. This reduces the quantity of ineffective magnetic flux flowing through the same tooth 151 to between the adjacent claw-like magnetic poles 53 and 54, thereby further improving the output.

Particularly, the number of slots increases and the tooth width decreases; therefore, the magnetic flux variation per time becomes great when the tooth travels over between the claw-like magnetic poles. For this reason, the inclined surface in this embodiment is effective.

Still furthermore, since the two three-phase alternating current windings 160 bear a phase difference of 30 degrees in electrical angle, the pulsation components are offset each other. Accordingly, as compared with the foregoing first embodiment in which the stator winding 16 is made with only one three-phase alternating current winding 160, an output voltage whose maximum and minimum values settle into a smaller difference is obtainable. In addition, the phase difference of 30 degrees can cancel spatial fifth- and seventh-order magnetomotive force harmonics causing a magnetic noise, thus reducing the magnetic noise.

Moreover, since alternating currents organizing the outputs of the two three-phase alternating current windings 160 are respectively rectified into direct currents by the rectifiers 12, there is no mutual electrical influence, which improves the output.

Sixth Embodiment

Figure 10:
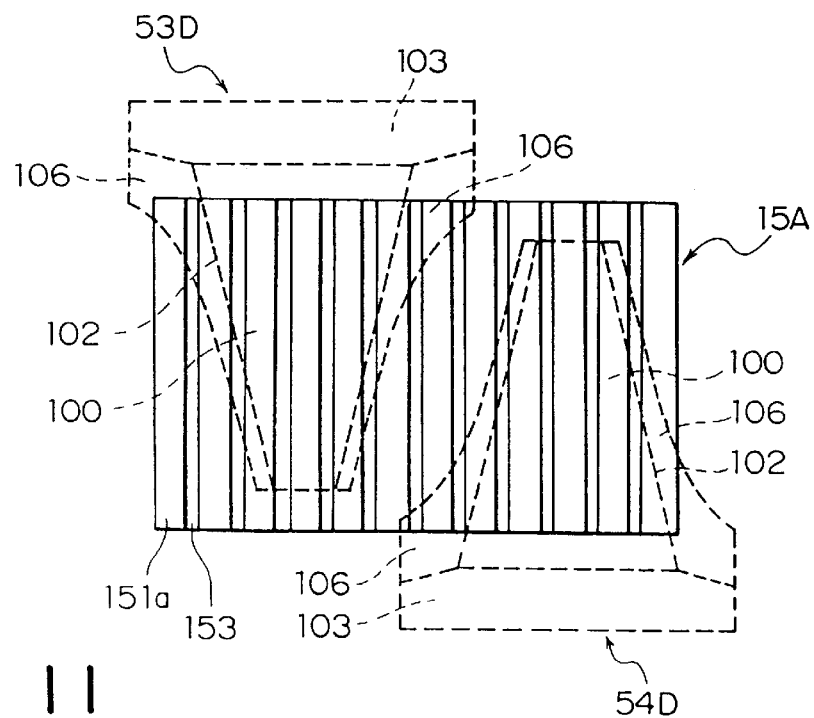
FIG. 10 is an illustration useful for explaining the positional relationship between an inner circumferential surface of a stator iron core and an outer circumferential surface of a rotor in the alternator for the vehicle according to a sixth embodiment of the invention.

In a sixth embodiment of the invention, as FIG. 10 shows, when the circumferential-direction central position between the adjacent claw-like magnetic poles 53D and 54D aligns with the circumferential-direction central position of an inner circumferential surface of a tip portion 151a of a tooth 151 in the case of being viewed from an radial direction, the tip portion 151a of the tooth 151 is made so as not to overlap with the outermost-diameter surfaces 100 of the claw-like magnetic poles 53D and 54D, but it is designed to overlap with an inclined surface 106 formed as an air gap enlargement surface. In addition, the tip portions 151a of the teeth 151 on both circumferential-direction sides of that tooth 151 are designed to overlap with a portion of each of the outermost-diameter surface 100 and the inclined surface 106 of each of the claw-like magnetic poles 53D and 54D when viewed from a radial direction.

The other configuration is similar to that of the foregoing fifth embodiment.

Also in this sixth embodiment, when the circumferential-direction central position between the adjacent claw-like magnetic poles 53D and 54D aligns with the circumferential-direction central position of the inner circumferential surface of the tip portion 151a of the tooth 151 in the case of being viewed from an radial direction, the tip portion 151a of the tooth 151 does not overlap with the outermost-diameter surfaces 100 of the claw-like magnetic poles 53D and 54D; therefore, the quantity of the ineffective magnetic flux that does not flow from the claw-like magnetic pole 53D through the tooth 151 to the core back 150 but flowing to the neighboring claw-like magnetic pole 54D is reducible, which results in an increase in the effective magnetic flux quantity. In consequence, the drop of the output at low-speed rotation regions stemming from the ineffective magnetic flux is restrainable as with the above-described fifth embodiment. In addition, the setting of $0<\tau<3\delta$ can enhance the output in low-speed rotation regions and secure the output in high-speed rotation regions.

Moreover, since the tip portion 151a of the tooth 151 overlaps with a portion of each of the claw-like magnetic poles 53D and 54D when the circumferential-direction central position between the adjacent claw-like magnetic poles 53D and 54D aligns with the circumferential-direction central position of the inner circumferential surface of the tip portion 151a of the tooth 151 in the case of being viewed from an radial direction, it is possible to reduce the magnetic flux variation and further to lessen the magnetic noise as in the case of the foregoing fifth embodiment.

Still moreover, according to this sixth embodiment, when the circumferential-direction central position between the adjacent claw-like magnetic poles 53D and 54D aligns with the circumferential-direction central position of the inner circumferential surface of the tip portion 151a of the tooth 151 in the case of being viewed from an radial direction, the tip portions 151a of the teeth 151 on both the circumferential-direction sides of that tooth 151 also overlap with a portion of each of the outermost-diameter surface 100 and the inclined surface 106 of each of the claw-like magnetic poles 53D and 54D. Thus, when viewed from a radial direction, the tip portions 151a of at least two teeth 151 overlap with portions of the outermost-diameter surface 100 and the inclined surface 106 at all times; hence, the magnetic flux density distribution between the claw-like magnetic poles 53D, 54D and the tip portions 151a of the teeth 151 shows gentler variation, thereby suppressing the magnetic noise resulting from the variation of the magnetic flux density distribution.

Incidentally, since, in the teeth 151 on both the sides thereof, the air gap with respect to the overlapped inclined surface 106 further enlarges, as compared with the foregoing fifth embodiment, the output drop becomes further imperceptible.

In this sixth embodiment, not only the tip portions 151a of a plurality of teeth 151 overlap with the adjacent claw-like magnetic poles 53D and 54D, but also the tip portion 151a of one tooth 151 does not overlap with the outermost-diameter surfaces 100 of the claw-like magnetic poles 53D and 54D but overlapping with the inclined surface 106, and even the tip portions 151a of the two teeth lying on both the circumferential-direction sides thereof overlap with a portion of each of the outermost-diameter surface 100 and the inclined surface 106 of each of the adjacent claw-like magnetic poles 53D and 54D; therefore, the magnetic flux density distribution varies slowly and successively over three teeth 151, which contributes greatly to the reduction of the magnetic noise.

Seventh Embodiment

Figure 11:
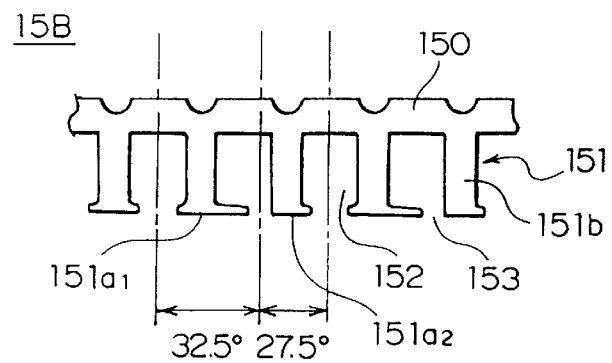
FIG. 11 is a plan view showing the essence of a stator iron core in an alternator for a vehicle according to a seventh embodiment of the invention.
Figure 12A:
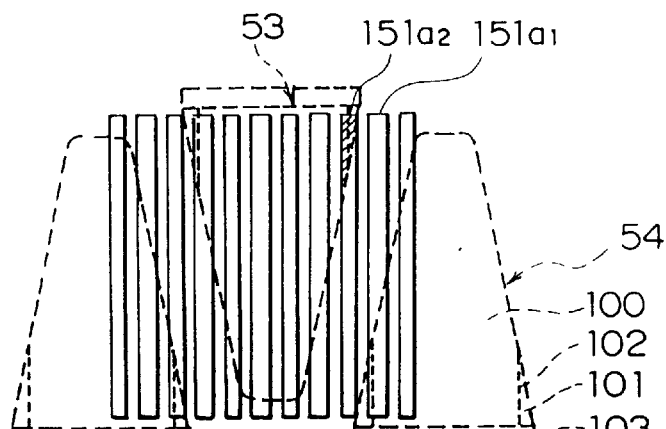
FIGS. 12A to 12D are illustrations useful for explaining the positional relationship between an inner circumferential surface of a stator iron core and an outer circumferential surface of a rotor in the alternator for the vehicle according to the seventh embodiment of the invention.
Figure 12B:
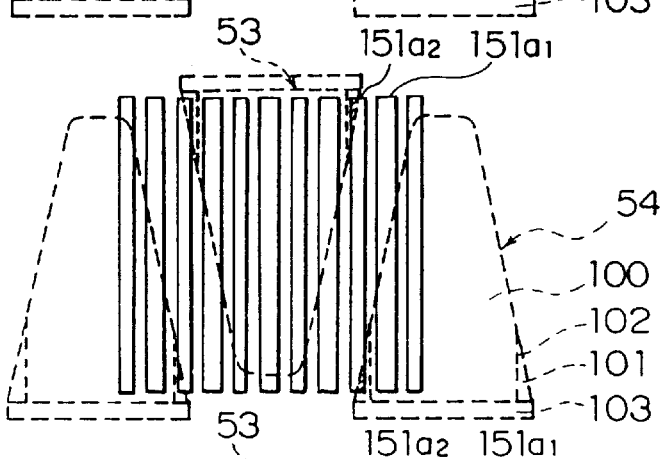
Figure 12C:
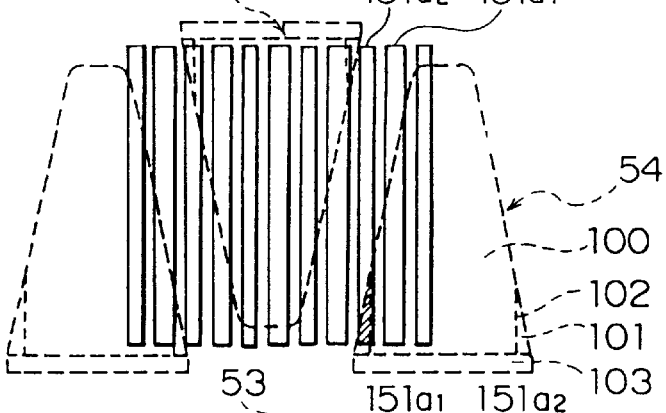
Figure 12D:
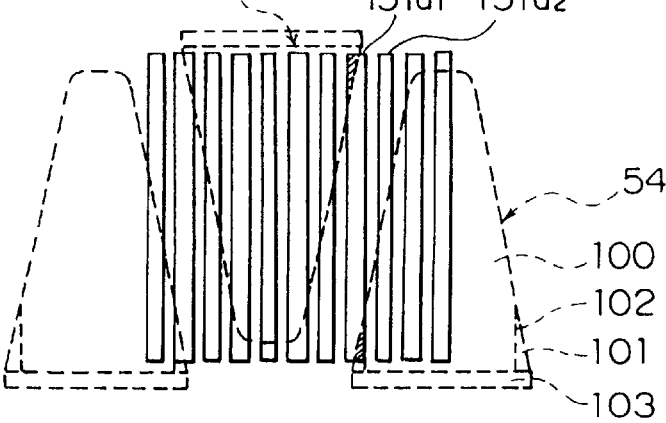
Figure 13:
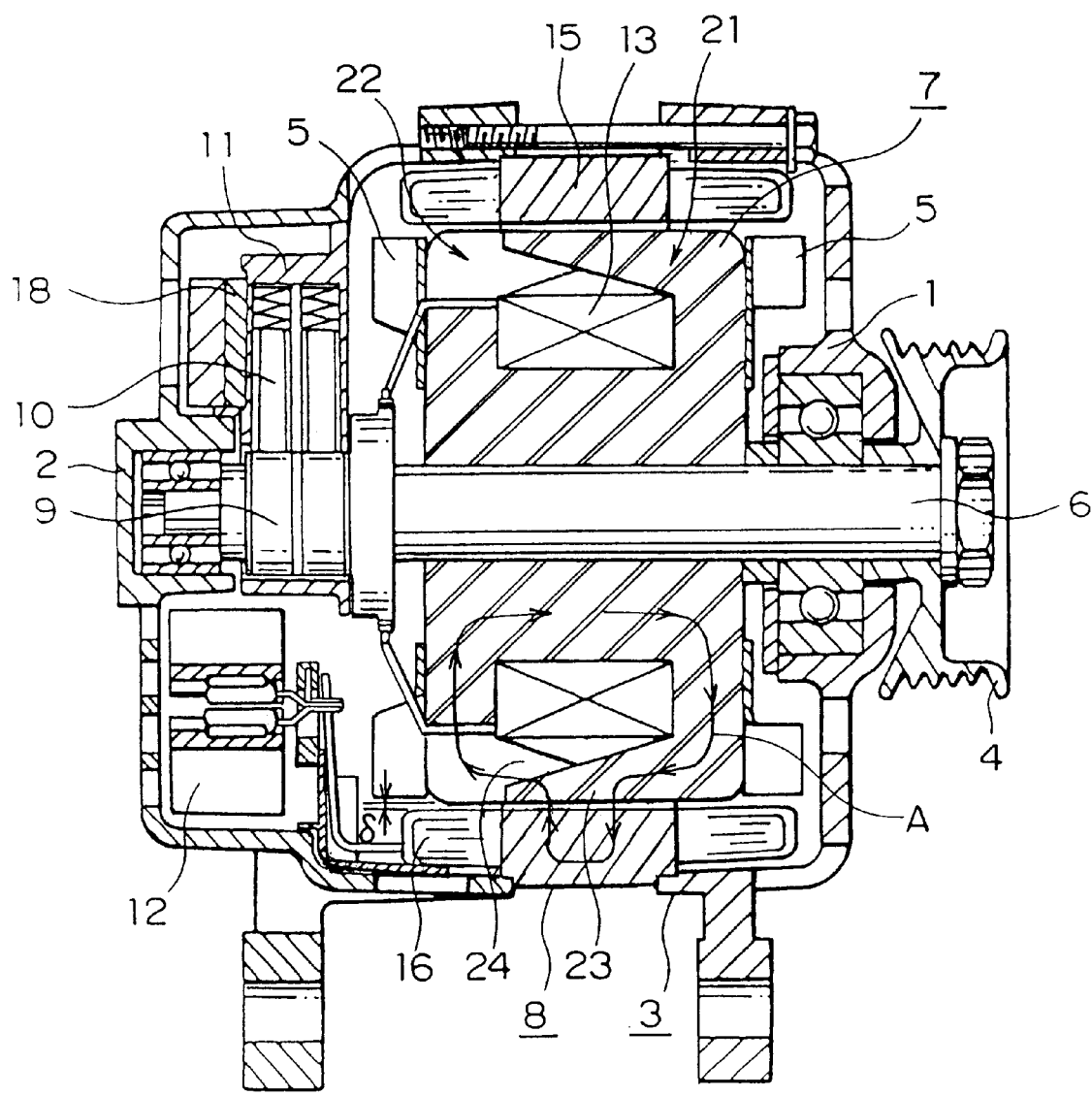
FIG. 13 is a cross-sectional view showing a conventional alternator for a vehicle.
Figure 14:
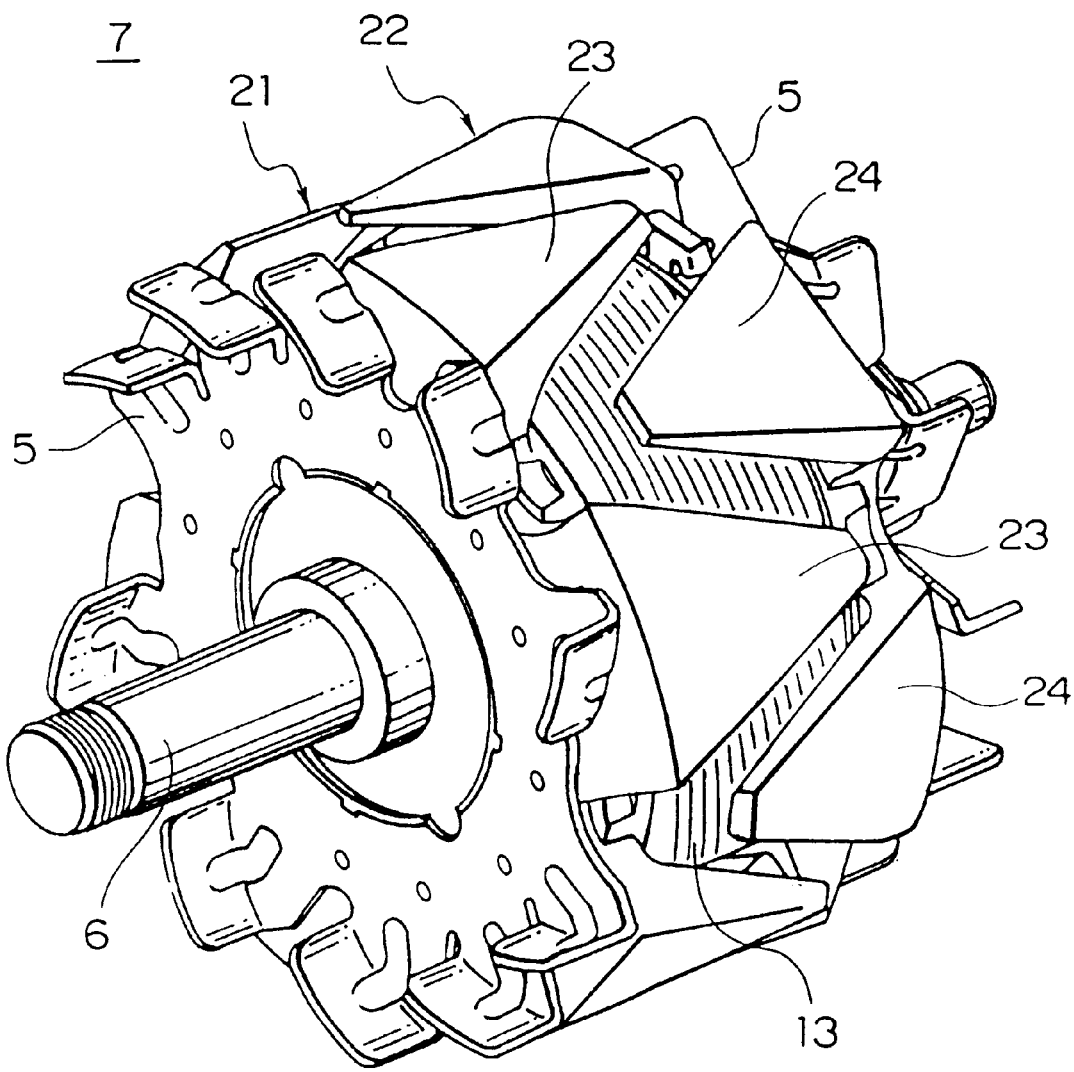
FIG. 14 is a perspective view showing a rotor for use in the conventional alternator for the vehicle.
Figure 15:
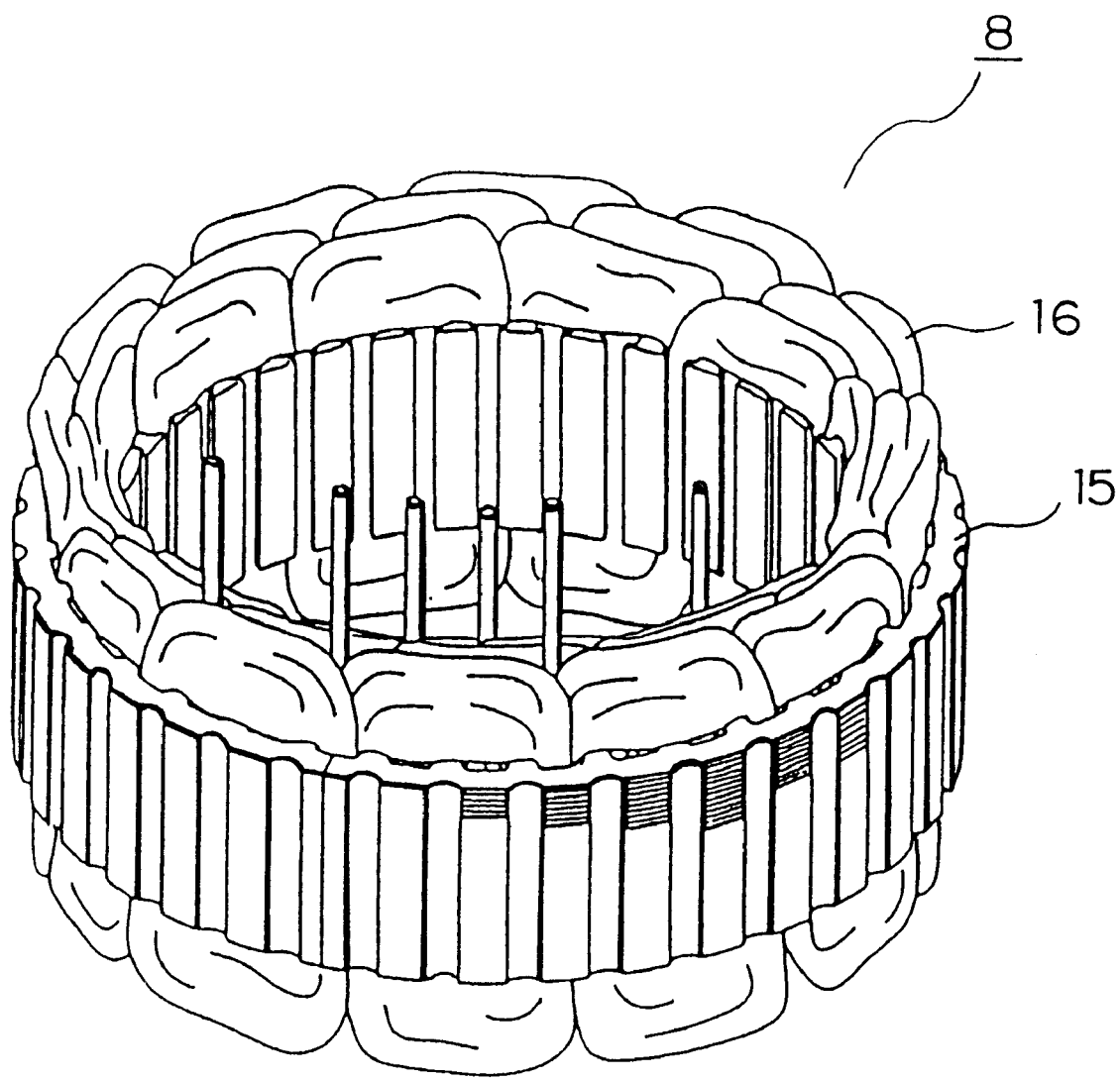
FIG. 15 is a perspective view showing a stator for use in the conventional alternator.
Figure 16:
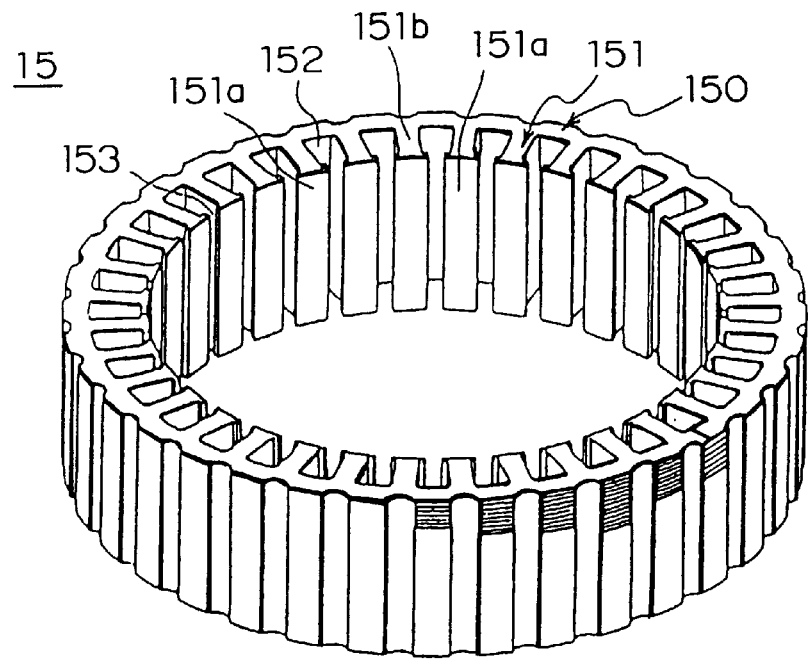
FIG. 16 is a perspective view showing a stator iron core of the stator for use in the conventional alternator.
Figure 17:
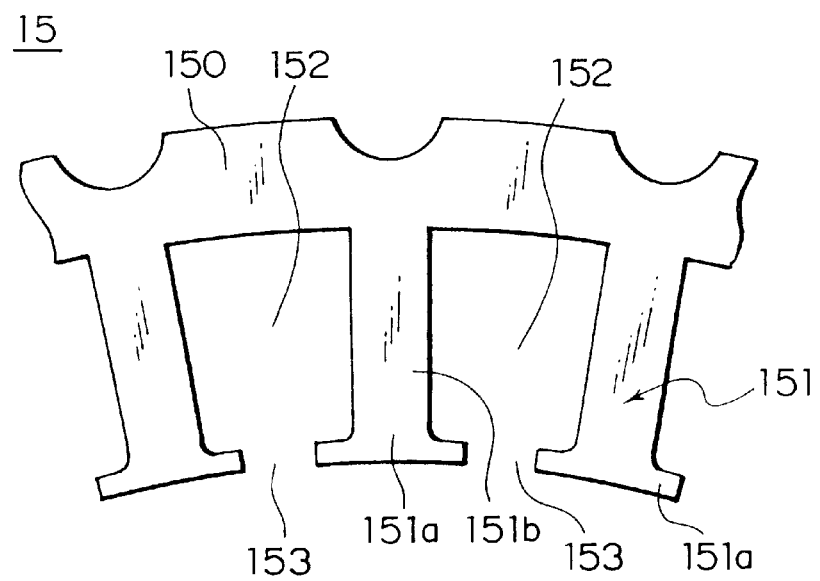
FIG. 17 is a perspective view showing the essence of the stator iron core of the stator for use in the conventional alternator.
Figure 18:
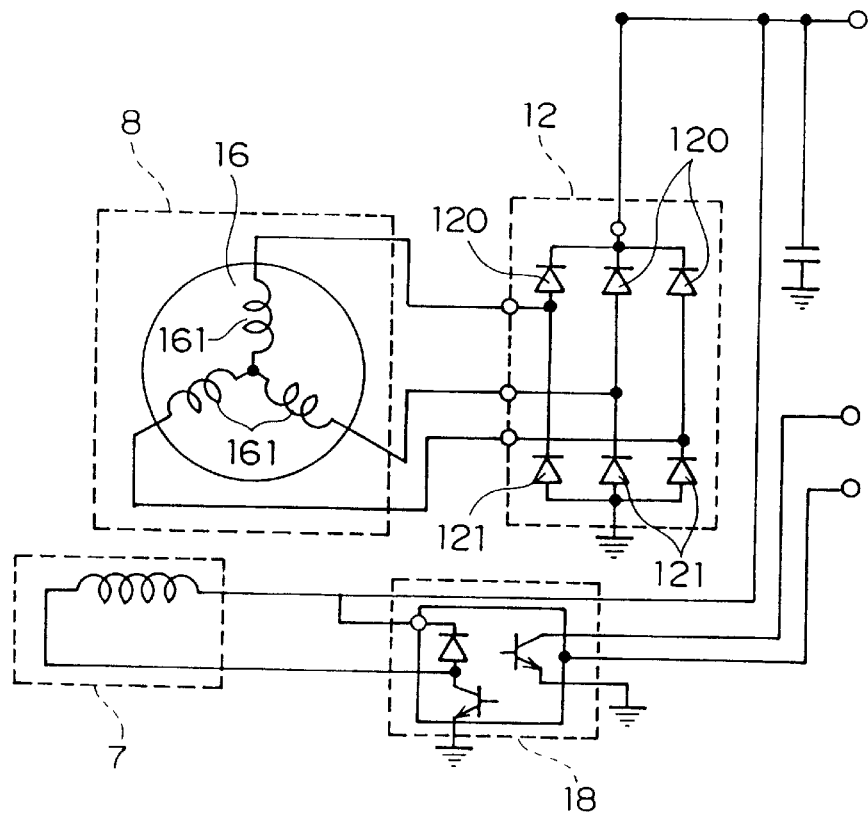
FIG. 18 is an illustration of a circuit for the conventional alternator for the vehicle.
Figure 19:
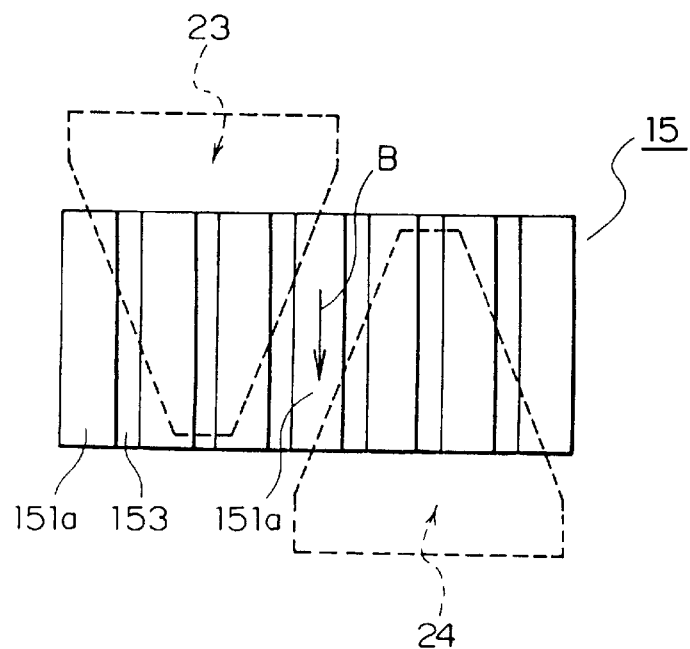
FIG. 19 is an illustration for describing the positional relationship between an inner circumferential surface of a stator iron core and an outer circumferential surface of a rotor in the conventional alternator for the vehicle.

FIG. 11 is a plan view showing the essence of a stator iron core for use in an alternator for a vehicle according to a seventh embodiment of the present invention, and FIGS. 12A to 12D are illustrations useful for explaining the positional relationship between an inner circumferential surface of the stator iron core and an outer circumferential surface of a rotor in the alternator for the vehicle according to the seventh embodiment of the invention.

In FIG. 11, in the stator iron core designated generally at numeral 15B, the circumferential-direction lengths of the tip portions of teeth 151 are adjusted so that circumferential-direction dimensions among the center lines of neighboring slot opening portions 153 are set unequally. In this case, broadened tip portions $151a_1$ and narrowed tip portions $151a_2$ are alternately formed in a circumferential direction so that the inter-center-line dimensions of the neighboring slot opening portions 153 assume 32.5 degrees and 27.5 degrees in electrical angle, respectively.

The other configuration is similar to that of the foregoing fifth embodiment.

That is, the inter-center-line dimension of the adjacent slots 152 is set at 30 degrees in electrical angle. In addition, when the circumferential-direction central position between the adjacent claw-like magnetic poles 53 and 54 aligns with the circumferential-direction central position of an inner circumferential surface of each of the top portions $151a_1$ and $151a_2$ of the teeth 151 in the case of being viewed from a radial direction, each of the top portions $151a_1$ and $151a_2$ of the teeth 151 does not overlap with the outermost-diameter surface 100 of each of the claw-like magnetic poles 53 and 54 but it overlaps with the inclined surface 101.

In this seventh embodiment, in accordance with the rotation of the rotor, there are taken a condition (shown in FIG. 12A) in which the tip portion $151a_2$ overlaps with only the claw-like magnetic pole 53 in a radial direction, a condition (shown in FIG. 12B) in which the tip portion $151a_2$ overlaps with both the claw-like magnetic poles 53 and 54, a condition (shown in FIG. 12C) in which the tip portion $151a_2$ overlaps with only the claw-like magnetic pole 54, a condition (shown in FIG. 12D) in which the tip portion $151a_1$ overlaps with both the claw-like magnetic poles 53 and 54, and other conditions.

Furthermore, since the broadened tip portions $151a_1$ and the narrowed tip portions $151a_2$ alternately pass through the two claw-like magnetic poles 53 and 54 different in polarity from each other when viewed from the rotor, as compared with the above-described fifth embodiment in which the tip portions 151a having a constant width pass at an equal period, the teeth tip portions which are halved in number and which are different in shape intervene alternately between the magnetic poles, which disperses the generated voltage fluctuation on the whole. That is, it is possible to reduce the ineffective magnetic flux, improve the output and restrain the generated voltage variation.

In addition, since the center-line spacing of the slot opening portions 153 assumes 32.5 degrees and 27.5 degrees alternately, the spatial eleventh-order and thirteenth-order components of the magnetomotive force harmonics of the stator forming magnetic flux density waveforms decrease while the spatial fifth-order and seventh-order components increase, which reduces unpleasant sounds with higher-order frequencies originating from the eleventh-order and thirteenth-order components, and further reduces generator magnetic flux wave motion to lessen the voltage fluctuation.

Furthermore, also in this seventh embodiment, when the circumferential-direction central position between the adjacent claw-like magnetic poles 53 and 54 aligns with the circumferential-direction central position of the inner circumferential surface of the tip portion 151a of the tooth 151 in the case of being viewed from an radial direction, the tip portions 151$a_1$ and 151$a_2$ of the teeth 151 do not overlap with the outermost-diameter surfaces 100 of the claw-like magnetic poles 53 and 54; therefore, the quantity of the ineffective magnetic flux that does not flow from the claw-like magnetic pole 53 through the tooth 151 to the core back 150 but flowing to the neighboring claw-like magnetic pole 54 is reducible, which results in an increase in the effective magnetic flux quantity. In consequence, the drop of the output at low-speed rotation regions stemming from the ineffective magnetic flux is restrainable as with the above-described fifth embodiment.

Still furthermore, since each of the tip portions 151$a_1$ and 151$a_2$ of the teeth 151 overlaps with a portion of each of the claw-like magnetic poles 53 and 54 when the circumferential-direction central position between the adjacent claw-like magnetic poles 53 and 54 aligns with the circumferential-direction central position of the inner circumferential surface of each of the tip portions 151$a_1$ and 151$a_2$ of the teeth 151 in the case of being viewed from an radial direction, it is possible to reduce the magnetic flux variation and further to lessen the magnetic noise as in the case of the above-described fifth embodiment.

Incidentally, although in the above-described embodiments the present invention has been applied to a three-phase alternator, it is also possible to apply the present invention to, for example, five-phase and seven-phase alternators, and the same effects are obtainable.

In addition, although in the above description of the embodiments the present invention has been applied to an alternator for a vehicle of the type in which the field coil 13 is wound around the pole core members 51 and 52 in a state surrounded by the claw-like magnetic poles and rotated together with the claw-like magnetic poles so that a field current is supplied through the brushes 10 to the field coil 13, the present invention is also applicable to a brushless type alternator for the vehicle in which a field coil is fixedly mounted on a bracket and a rotating magnetic field is supplied through an air gap to a stator, and also in this case, the same effects are attainable.

Since the present invention constructed as described above, the invention expectably offer following effect.

In accordance with the present invention, there is provided an alternator for a vehicle, comprising a stator including a stator iron core having a plurality of teeth extending radially inwardly and arranged at an interval in a circumferential direction to define slots between the plurality of teeth and a stator winding disposed in the slots, and a rotor including a pair of pole core members each of which has tapered claw-like magnetic poles formed on its outer-diameter side at a predetermined pitch in a circumferential direction and which are fixedly mounted on a shaft in a state where their claw-like magnetic poles engage with each other and further which are located inside the said stator so that a constant air gap δ is defined between the outermost-diameter surfaces of the claw-like magnetic poles and the tip portions of the teeth and a field coil located to be covered with the claw-like magnetic poles, wherein each of the claw-like magnetic poles includes an air gap enlargement surface formed in at least a portion of each of both circumferential-direction side portions on its outer-diameter side to provide an air gap larger than the air gap δ with respect to the tip portion of each of the teeth and, and when a circumferential-direction central position between the adjacent claw-like magnetic poles is aligned (meets) with a circumferential-direction central position of the tip portion of the tooth in the case of being viewed from a radial direction, the tip portion of the tooth does not overlap with the outermost-diameter surface of each of the adjacent claw-like magnetic poles, but it overlaps with at least a portion of the air gap enlargement surface of each of the adjacent claw-like magnetic poles, and a circumferential-direction distance τ between the outermost-diameter surface and the tip portion of the tooth is set to be 0<τ<3δ. This construction can provide an alternator for a vehicle which is capable of not only improving the output in low-speed rotation regions, but also securing the output in high-speed rotation regions, and even reducing magnetic noise.

In addition, the air gap enlargement surface comprises an inclined surface formed in each of both the circumferential-direction side portions lying on the outer-diameter side of a proximal section of each of the claw-like magnetic poles. Accordingly, the magnetic flux density distribution varies slowly in the overlapping section between the tooth tip portion and the air gap enlargement surface, which suppresses the deterioration in magnetic noise, and enlarges the outermost-diameter surface to improve the output.

Still additionally, the air gap enlargement surface comprises an inclined surface formed in each of both the circumferential-direction side portions lying on the outer-diameter side of each of the claw-like magnetic poles to extend from a proximal side of the claw-like magnetic pole to a tip portion side thereof. Accordingly, when the claw-like magnetic pole overlaps with the tip portion of the tooth in a radial direction, the magnetic flux density distribution varies gently in both the circumferential-direction sides of the claw-like magnetic pole.

In this case, the inclined surface is formed into a tapering configuration in which its circumferential-direction width gradually decreases from a proximal side of the claw-like magnetic pole to a tip portion side thereof. Also in this case, the outermost-diameter surface is enlargeable, thereby improving the output.

Moreover, each of shoulder portions of the claw-like magnetic pole located on both axial-direction end sides of the rotor is formed into an inclined surface having one of rounded and tapered configurations, and the outermost-diameter surface, the air gap enlargement surface and the shoulder portion inclined surface are brought close to each other in the vicinity of each of both axial-direction ends of the tip portion of the tooth. Thus, the quantity of the ineffective magnetic flux that flows from the shoulder portion of one claw-like magnetic pole through the tooth to the other claw-like magnetic pole is reducible, thereby suppressing the reduction of the bypassing quantity of a magnetic flux, generated in the field coil, to the stator winding.

Still moreover, the tip portions of the plurality of teeth are made to overlap with a plane including the outermost-diameter surface and the air gap enlargement surface in each of the adjacent claw-like magnetic poles, when viewed from a radial direction. Thus, a gentle variation of the magnetic flux density distribution takes place, thereby reducing the magnetic noise.

Furthermore, the stator has two slots per pole and per phase. Thus, the circumferential-direction width of the tip portion of the tooth decreases and the magnetic flux passage cross section of the tooth tip portion decreases, which can reduce the quantity of the ineffective magnetic flux flowing through the tooth to between the adjacent claw-like magnetic poles.

In addition, the stator winding is composed of two alternating current windings different in phase from each other. This offsets the pulsation components.

Still additionally, the circumferential-direction widths of the tip portions of the teeth are formed in an unequal condition. Also in this case, it is possible to reduce the ineffective magnetic flux reduces, improve the output and restrain the fluctuation of the generated voltage.

The foregoing description of the preferred embodiments of the invention has been presented for purposes of illustration and description. It is not intended to be exhaustive or to limit the invention to the precise from disclosed, and modifications and variations are possible in light of the above teachings or may be acquired from practice of the invention. The embodiments ware chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An alternator for a vehicle, comprising:
   a stator including a stator iron core having a plurality of teeth extending radially inwardly and arranged at an interval in a circumferential direction to define slots between said plurality of teeth, and a stator winding disposed in said slots; and
   a rotor including a pair of pole core members each of which has a plurality of tapered claw-like magnetic poles formed on its outer-diameter side at a predetermined pitch in a circumferential direction, and located inside said stator so that a constant air gap δ is defined between outermost-diameter surfaces of said claw-like magnetic poles and tip portions of said teeth,
   wherein each of said claw-like magnetic poles includes an air gap enlargement surface formed in at least a portion of each of both circumferential-direction side portions on an outer-diameter side to provide an air gap larger than said air gap δ with respect to said tip portion of each of said teeth, and when a circumferential-direction central position between the adjacent claw-like magnetic poles is aligned with a circumferential-direction central position of said tip portion of said tooth viewed from a radial direction, said tip portion of said tooth does not overlap with said outermost-diameter surface of each of the adjacent claw-like magnetic poles, and said tip portion overlaps with at least a portion of said air gap enlargement surface of each of the adjacent claw-like magnetic poles, and a circumferential-direction distance τ between said outermost-diameter surface and said tip portion of said tooth is set to be 0<τ<3δ.

2. The alternator for the vehicle according to claim 1, wherein a shoulder portion of each of said claw-like magnetic poles located on both axial-direction end sides of said rotor forms an inclined surface having one of rounded and tapered configurations, and said outermost-diameter surface, said air gap enlargement surface and said shoulder portion inclined surface are brought close to each other in the vicinity of each of both axial-direction ends of said tip portion of said tooth.

3. The alternator for the vehicle according to claim 1, wherein said tip portions of said plurality of teeth overlap with a plane including said outermost-diameter surface and said air gap enlargement surface in each of the adjacent claw-like magnetic poles when viewed from a radial direction.

4. The alternator for the vehicle according to claim 1, wherein said air gap enlargement surface comprises an inclined surface formed in both circumferential-direction side portions lying on an outer-diameter side of a proximal section of each of said claw-like magnetic poles.

5. The alternator for the vehicle according to claim 4, wherein a shoulder portion of each of said claw-like magnetic poles located on both axial-direction end sides of said rotor forms an inclined surface having one of rounded and tapered configurations, and said outermost-diameter surface, said air gap enlargement surface and said shoulder portion inclined surface are brought close to each other in the vicinity of each of both axial-direction ends of said tip portion of said tooth.

6. The alternator for the vehicle according to claim 4, wherein said tip portions of said plurality of teeth overlap with a plane including said outermost-diameter surface and said air gap enlargement surface in each of the adjacent claw-like magnetic poles when viewed from a radial direction.

7. The alternator for the vehicle according to claim 1, wherein said air gap enlargement surface comprises an inclined surface formed in both circumferential-direction side portions lying on the outer-diameter side of each of said claw-like magnetic poles to extend from a proximal side of said claw-like magnetic pole to a tip portion side thereof.

8. The alternator for the vehicle according to claim 7, wherein a shoulder portion of each of said claw-like magnetic poles located on both axial-direction end sides of said rotor forms an inclined surface having one of rounded and tapered configurations, and said outermost-diameter surface, said air gap enlargement surface and said shoulder portion inclined surface are brought close to each other in the vicinity of each of both axial-direction ends of said tip portion of said tooth.

9. The alternator for the vehicle according to claim 7, wherein said tip portions of said plurality of teeth overlap with a plane including said outermost-diameter surface and said air gap enlargement surface in each of the adjacent claw-like magnetic poles when viewed from a radial direction.

10. The alternator for the vehicle according to claim 7, wherein said inclined surface forms a tapering configuration in which its circumferential-direction width gradually decreases from a proximal side of said claw-like magnetic pole to a tip portion side thereof.

11. The alternator for the vehicle according to claim 10, wherein a shoulder portion of each of said claw-like magnetic poles located on both axial-direction end sides of said rotor forms an inclined surface having one of rounded and tapered configurations, and said outermost-diameter surface, said air gap enlargement surface and said shoulder portion inclined surface are brought close to each other in the vicinity of each of both axial-direction ends of said tip portion of said tooth.

12. The alternator for the vehicle according to claim 10, wherein said tip portions of said plurality of teeth overlap with a plane including said outermost-diameter surface and said air gap enlargement surface in each of the adjacent claw-like magnetic poles when viewed from a radial direction.

13. The alternator for the vehicle according to claim 1, wherein said stator has two slots per pole and per phase.

14. The alternator for the vehicle according to claim 13, wherein said stator winding includes two alternating-current windings different in phase from each other.

15. The alternator for the vehicle according to claim 1, wherein circumferential-direction widths of said tip portions of said teeth are unequal.

* * * * *